May 15, 1956     M. F. SMITH     2,745,581
BUS OPERATORS PUNCH AND TRANSFER HOLDER
Filed Feb. 20, 1953
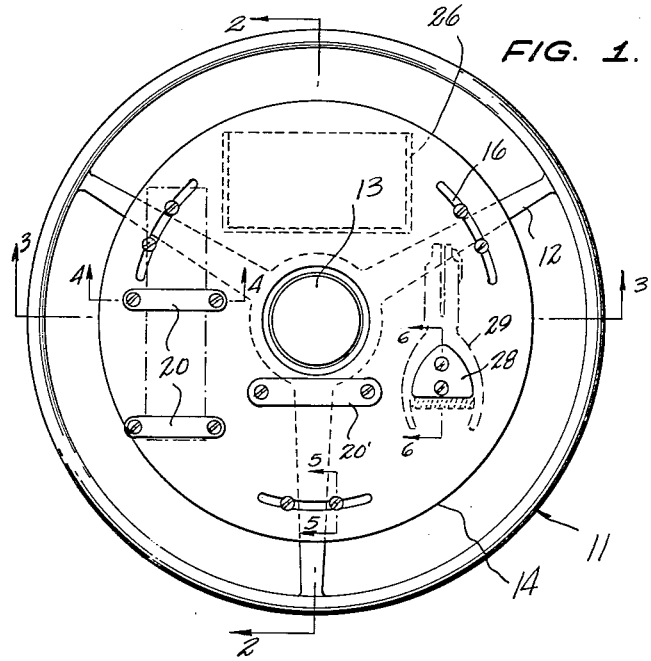
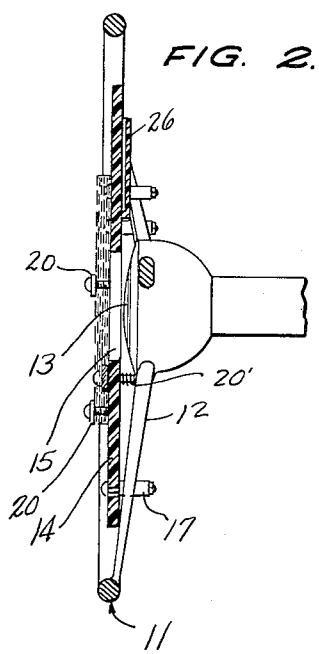
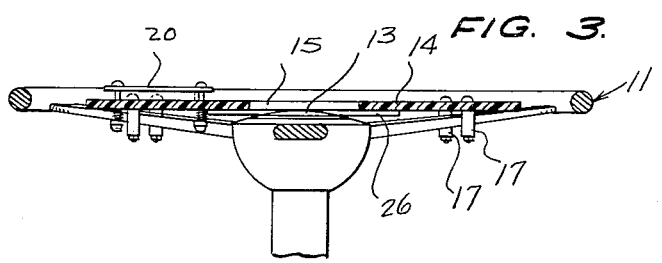
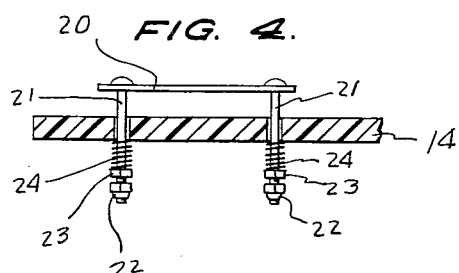
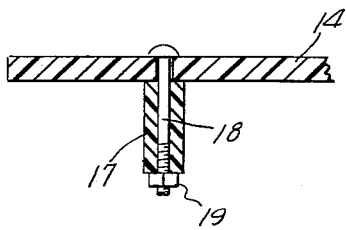
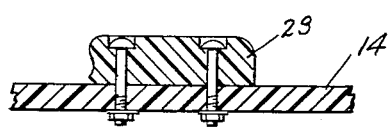
INVENTOR.
MERLE F. SMITH,
BY
McMorrow, Berman + Davidson
ATTORNEYS

United States Patent Office 2,745,581
Patented May 15, 1956

2,745,581

BUS OPERATORS PUNCH AND TRANSFER HOLDER

Merle F. Smith, Hammond, Ind.

Application February 20, 1953, Serial No. 337,973

2 Claims. (Cl. 224—29)

This invention relates to supporting devices for bus operators implements, and more particularly to an improved supporting device for holding transfers and other objects, the device being adapted to be supported on the steering wheel in front of the driver.

A main object of the invention is to provide a novel and improved supporting device for objects required by a bus operator, such as transfers, a punch, and the like, said supporting device being simple in construction, being easy to install on a steering wheel, and being readily accessible to the driver so that objects thereon may be removed without requiring the driver to shift his vision from the roadway in front of the vehicle.

A further object of the invention is to provide an improved transfer and punch holding device adapted to be mounted on the steering wheel of a bus or similar vehicle, the holding device being inexpensive to manufacture, being compact in size, being durable in construction, and providing a convenient support for the various objects required by a bus operator and being arranged so that the operator may readily obtain the objects without diverting his attention from the normal operation of his vehicle.

Further objects and advantages of the invention will become apparent from the following description and claims, and from the accompanying drawing, wherein:

Figure 1 is a top plan view of the steering wheel of a vehicle on which is supported an article holding device according to the present invention.

Figure 2 is a cross sectional view taken on the line 2—2 of Figure 1.

Figure 3 is a cross sectional view taken on the line 3—3 of Figure 1.

Figure 4 is an enlarged cross sectional detail view taken on the line 4—4 of Figure 1.

Figure 5 is an enlarged cross sectional detail view taken on the line 5—5 of Figure 1.

Figure 6 is an enlarged cross sectional detail view taken on the line 6—6 of Figure 1.

Referring to the drawings, 11 designates the steering wheel of a bus or similar vehicle, said steering wheel being provided with the three spokes 12 which are spaced at equal angles around the wheel, the wheel being provided with the centrally located horn button 13. The article supporting device of the present invention may comprise an annular disc member 14 of suitable rigid sheet material, such as transparent plastic or the like, the disc member 14 being provided with a central aperture 15 adapted to overlie the horn button 13, as shown in Figures 1, 2 and 3.

The disc member 14 is formed with the respective arcuate slots 16 arranged to overlie the respective radial spokes 12 of the steering wheel when the disc member 14 is positioned on the steering wheel in the manner illustrated in Figure 1. The arcuate slots 16 are concentric with the circular aperture 15 of the disc member and are preferably arranged at equal radial distances from the center of the disc member. Adjustably secured to the disc member at each arcuate slot 16 are the pair of depending cylindrical finger members 17, 17, each finger 17 being formed with an axial bore through which extends the shank of a bolt 18, said bolt extending through the arcuate slot 16 and being provided at its bottom end with a nut 19, whereby each finger 17 may be clamped in an adjusted position along its associated slot 16. The fingers 17, 17 are arranged to lockingly engage on opposite sides of the adjacent spoke 12 when the disc member is positioned on the steering wheel, whereby the disc member 14 is held against movement relative to the steering wheel.

Designated at 20, 20 are parallel bar members which are resiliently clamped to the disc member 14 by respective pairs of bolts 21, 21 extending through the end portions of the bar members 20 and being provided at their bottom ends with the self-locking nuts 22, as shown in Figure 4. Threaded on the lower portions of the bolts 21 are the respective adjustable nuts 23, and surrounding the bolts between the nuts 23 and the disc member 14 are the respective coiled springs 24 which act to bias the bar members 20 downwardly. The bar members 20, 20 are adapted to clampingly engage a stack of transfers or the like, to hold the transfers on the disc member 14, with the upper portions of the transfers exposed so that the operator of the bus may tear said upper portions off for distribution to the passengers of the vehicle.

The disc member 14 has secured to its bottom surface a flat rectangular receptacle 26 which is located at the upper portion of the disc member, as viewed in Figure 1, said receptacle being adapted to receive a printed card or sheet of paper containing safety instructions, or the like, which will be conspicuous and which will be continuously visible to the operator of the vehicle, whereby the operator will be constantly aware of the safety regulations and other information of assistance in influencing him in exerting due care in the operation of the vehicle.

Secured on the disc member 14 on the side thereof opposite the clamping bars 20, 20 is a generally triangular block member 28 adapted to support a ticket punch 29, the legs of the ticket punch being engaged around the block member 28 in the manner illustrated in Figure 1, wherein the ticket punch 29 is shown in dotted view. Thus, the ticket punch may be supported on the disc member but may be readily removed therefrom when required by the operator.

An additional clamping bar, shown at 20', may be provided on the disc member adjacent to the central aperture 15 thereof, as shown in Figure 1, said clamping member 20' being resiliently secured to the disc member in the same manner as the clamping bars 20, 20, above described.

While a specific embodiment of an improved transfer and punch holding device arranged to be mounted on the steering wheel of a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A transfer and punch holder comprising an annular disc member adapted to be positioned on a steering wheel, said disc member being formed with a plurality of arcuate slots spaced to overlie the spokes of the steering wheel, respective pairs of depending fingers depending from the disc member beneath said slots, respective fastening members extending through the slots and engaging the fingers to adjustably secure the fingers to the disc member in position to lockingly engage opposite sides of the spokes of the steering wheel, and a generally triangular block secured on said disc member and adapted to be engaged between the legs of a punch to hold the punch on the disc member.

2. A transfer and punch holder comprising an annular disc member adapted to be positioned on a steering wheel, said disc member being formed with a plurality of arcuate slots spaced to overlie the spokes of the steering wheel, respective pairs of depending fingers depending from the disc member beneath said slots, respective fastening members extending through the slots and engaging the fingers to adjustably secure the fingers to the disc member in position to lockingly engage opposite sides of the spokes of the steering wheel, and a plurality of parallel clamping bars resiliently secured to the disc member for clampingly securing transfers to said disc member.

References Cited in the file of this patent

UNITED STATES PATENTS

| | | |
|---|---|---|
| 760,922 | Rodman | May 24, 1904 |
| 1,717,433 | Bragg et al. | June 18, 1929 |
| 2,518,127 | Dobbs | Aug. 8, 1950 |